(12) United States Patent
Edwards et al.

(10) Patent No.: US 8,627,313 B2
(45) Date of Patent: Jan. 7, 2014

(54) VIRTUAL MACHINE LIVENESS DETERMINATION

(75) Inventors: Aled Edwards, Charfield South (GB); Anna Fischer, Bristol (GB); Patrick Goldsack, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 944 days.

(21) Appl. No.: 12/400,510

(22) Filed: Mar. 9, 2009

(65) Prior Publication Data

US 2010/0077395 A1    Mar. 25, 2010

(30) Foreign Application Priority Data

Mar. 7, 2008  (GB) .................................. 0804259.0

(51) Int. Cl.
*G06F 9/455*  (2006.01)
*G06F 15/173*  (2006.01)

(52) U.S. Cl.
USPC ............................................. 718/1; 709/238

(58) Field of Classification Search
None
See application file for complete search history.

(56) References Cited

U.S. PATENT DOCUMENTS

| | | | |
|---|---|---|---|
| 7,639,607 B2 | 12/2009 | Fujii et al. | |
| 7,657,659 B1 | 2/2010 | Lambeth et al. | |
| 2004/0123050 A1* | 6/2004 | Knop et al. | 711/147 |
| 2004/0267866 A1 | 12/2004 | Carollo et al. | |
| 2005/0182853 A1* | 8/2005 | Lewites et al. | 709/238 |
| 2006/0153191 A1 | 7/2006 | Rajsic et al. | |
| 2007/0058638 A1* | 3/2007 | Guichard et al. | 370/395.31 |
| 2008/0240102 A1 | 10/2008 | Rajsic et al. | |
| 2008/0244690 A1 | 10/2008 | Kulkarni et al. | |
| 2009/0016331 A1 | 1/2009 | Shah et al. | |

FOREIGN PATENT DOCUMENTS

| | | |
|---|---|---|
| GB | 2418326 | 3/2006 |
| JP | 7325773 A | 12/1995 |
| WO | 95/01023 | 1/1995 |
| WO | WO 99/44132 | 9/1999 |
| WO | 02/19056 | 3/2002 |
| WO | 2005/022807 | 3/2005 |
| WO | WO 2007/063132 A1 | 6/2007 |

* cited by examiner

*Primary Examiner* — Eddie P Chan
*Assistant Examiner* — William B Partridge (57) ABSTRACT

A data center can share processing resources using virtual networks. A hosting program 9,10 hosts one or more virtual machines 11, 12. The program has a virtual interface VIF 1 14, to the virtual machines, a network interface 19 to enable communication between the virtual machines and other nodes of a network, and an infrastructure management interface 8, invisible to the virtual machines. The program has an intercept function 7 implemented as a comparator, switch or router, arranged to intercept a status message from one of the virtual machines, or applications run by that virtual machine. The status indication is sent to a status buffer 5 and is made available to the infrastructure management interface without providing a network path between the management interface and the virtual machine. This can discriminate between VM failure and communication failure, and the invisibility maintains isolation and helps avoid vulnerability to denial of service attack.

17 Claims, 6 Drawing Sheets

VIRTUAL MACHINE LIVENESS DETERMINATION

CLAIM FOR PRIORITY

This application claims the benefit of priority under 35 U.S.C. §119 to United Kingdom Patent Application No. 0804259.0, filed on Mar. 7, 2008, the disclosure of which is hereby incorporated by reference in its entirety.

RELATED APPLICATIONS

This application relates to commonly assigned and copending U.S. patent application Ser. No. 12/400,526 entitled "DISTRIBUTED NETWORK CONNECTION POLICY MANAGEMENT" and U.S. patent application Ser. No. 12/400,491 entitled "ROUTING ACROSS A VIRTUAL NETWORK", filed on even date herewith, and hereby incorporated by reference in their entirety.

FIELD OF THE INVENTION

The invention relates to programs for hosting virtual machines, and to corresponding networks, data centers, methods of providing services from a data center, and methods of using such services.

BACKGROUND

In most physical information technology (IT) infrastructures IT infrastructure, resource utilization is very low: 15% is not an uncommon utilization for a server, 5% for a desktop. It is known to try to address this by sharing a physical machine between different users. Typically in a utility data center there may be hundreds of machines networked and shared by many enterprises. Each enterprise may be running many applications to serve their own customers. Known operating systems can be used to time share the physical processing resources of the machines between the different enterprises. Various ways are known to abstract or hide the underlying physical resources from the applications run by the enterprises. Overlay networks are known and make it easy to change the network configuration, abstracting devices from the configuration of the real network.

Storage virtualisation is also known. There are many commercial storage virtualization products on the market from HP, IBM, EMC and others. These products are focused on managing the storage available to physical machines and increasing the utilization of storage.

Virtual machine technology is a known mechanism to run operating system instances on one physical machine independently of other operating system instances. It is known to have a single physical hosting machine running two or more virtual machines connected by a virtual network on this machine.

A virtual machine (VM) is a self-contained operating environment that emulates a hardware platform. It can run a "guest" operating system. A real operating system called a virtual machine manager (VMM) is run on the physical hardware platform. The VMM runs one or more VMs and can contain multiple virtual devices, one of which can be a virtual network interface card (VNIC). VMware is a known example of virtual machine technology, and can provide isolated environments for different operating system instances running on the same physical machine.

An example of a virtual network interface is described in "SoftUDC: A Software-Based Data Center for Utility Computing", Kallahalla et al, Computer, November 2004, p 38-46. Virtual machines access networking via a virtual network interface (VIF), which mimics an Ethernet device. A virtual machine manager (VMM) forwards outbound network packets to its physical network interface and dispatches incoming network packets to appropriate VIFs. The VMM encapsulates the packet and sends it to another VMM or a virtual router on the same VNET. The receiving VMM unwraps the packet and delivers it to the target VM.

Network traffic from virtual machines is distributed to virtual interfaces via Ethernet bridging in a special virtual machine containing a kernel module. The kernel module uses the EtherIP protocol to encapsulate outbound Ethernet traffic destined for a VNET in an internet protocol (IP) packet and forwards the packet to the network. The kernel module decapsulates inbound EtherIP traffic to produce an Ethernet frame, which it delivers to VIFs on its VNET. An EtherIP header field stores a packet's VNET identification for transport across the network.

If a VIF requires direct access to the physical network, the kernel module delivers its traffic to the network without encapsulation. Ethernet frames are encapsulated rather than IP traffic primarily because doing so allows virtual machines to use any network protocol transparently. In addition, handling the Ethernet frame is simpler than extracting an IP packet.

The kernel module must direct encapsulated VNET traffic to a suitable IP address. This care-of address is based on the Ethernet frame and VNET destination media access control (MAC) address. If the MAC address is a broadcast or multicast address, the care-of address is the local VNET multicast address. If the MAC address is a unicast address, the care-of address is the real IP address of the machine hosting the addressed VIF.

A Virtual Address Resolution Protocol (VARP) is used to discover VIF care-of addresses, which can change during virtual machine migration. Broadcasting a VARP reply for all VIFs maintains network connectivity by updating the VARP caches of any systems communicating with the virtual machine.

In "Towards Automated Provisioning of Secure Virtualized Networks", by Cabuk et al, November 2007, it is explained that a VMM can be hosted directly on the computer hardware (e.g., XEN) or within a host operating system (e.g., VMware). Today's virtual network implementations for VMMs are usually virtual switches or bridges that connect the virtual network cards of all VMs to the actual physical network card of the physical machine. All VMs can potentially see all traffic; hence, no isolation or other security guarantees can be given. While that level of security may be sufficient for individual and small enterprise purposes, it is certainly not sufficient for larger-scale, security-critical operations. This document proposes security-enhanced network virtualization, which (1) allows groups of related VMs running on separate physical machines to be connected together as though they were on their own separate network fabric, and (2) enforces cross-group security requirements such as isolation, confidentiality, integrity, and information flow control.

Related VMs (e.g., VMs belonging to the same customer in a data center) distributed across several physical machines, are grouped into virtual enclave networks, so that each group of VMs has the same protection as if the VMs were hosted on a separate physical local area network (LAN). If some VMs in a group are co-hosted on the same hardware; it is not necessary to involve the physical network during information flow between two such VMs.

A secure network virtualization framework helps realize the abstraction of Trusted Virtual Domains (TVDs) by guaranteeing reliable isolation and flow control between domain boundaries. The framework is based on existing and well-established network virtualization technologies such as Ethernet encapsulation, VLAN tagging, and virtual private networks (VPNs).

In data centers having computing infrastructure shared by many enterprises, such customer VMs, typically should have no network visibility of the data-centre management system and ideally, neither should customer VMs be network visible to the management system. But for the data center operator unfortunately this makes it difficult to detect whether applications within customer VMs are still up and running as no bi-directional network path exists. This information would help enable the data center to alert the customers that their applications are no longer running and could help in making decisions about how much resource to allocate to such VMs and their applications.

BRIEF DESCRIPTION OF THE FIGURES

Specific embodiments of the invention will now be described, by way of example, to show how they may be implemented, with reference to the accompanying figures, in which.

DESCRIPTION OF SPECIFIC EMBODIMENTS

Embodiments described below show how the claimed invention can be implemented in various forms such as hosting programs, methods of hosting, data centers having multiple hosting machines coupled by a network, and methods of using services provided by applications hosted by such data centers. Any additional features can be added to the features claimed, without departing from the scope of the claims. Some such additional features are set out in dependent claims, and some are shown in the embodiments of the invention described in more detail below. The methods of use aspects are useful to get direct infringement or inducing of direct infringement in cases where the system is largely located outside the jurisdiction, as is feasible with many such systems, yet the user is using the system and gaining the benefit, from within the jurisdiction. Some advantages are explained below, other advantages may be apparent to those skilled in the art, particularly over other prior art than that known to the inventors. Any of the additional features can be combined together, and combined with any of the aspects, as would be apparent to those skilled in the art. The embodiments are examples only, the scope is not limited by these examples, and many other examples can be conceived within the scope of the claims.

Definitions:

"Status" of an application is intended to encompass any information about the application, and can be provided by the application itself or by other entities monitoring the application such as the VM operating system which hosts the application. Examples of status can be current or historical information on memory consumption, processing consumption, durations of execution and many others.

"liveness" can encompass any indication that the application is still running, including an indication that a new status message has been generated, for example by incrementing a counter when a status message is intercepted or buffered.

Data center is intended to encompass one or more computing machines grouped together at a single location whether for use by a single organisation or for sharing by many customers of a service provider organisation.

The term "virtual" usually means the opposite of real or physical, and is used where there is a level of indirection, or some mediation between a resource user and a physical resource.

"virtual entity" can encompass for example a virtual machine, a group of virtual machines, a virtual storage element, a virtual interface card, a virtual look up table, and so on, usually implemented as software to emulate a corresponding physical entity.

"Virtual machine" (VM) encompasses a system that emulates in software an entity such as a physical computer, or any processing entity, including entities for carrying out specific functions such as router firewall, gateway and so on, which can generate or make use of messages. Ideally, programs run by the virtual machine should have no way of determining whether they are running atop a virtual machine or a physical machine. Note, in current practice, sometimes programs are aware they're running in virtual machines so that they can optimize for it. A VM can have one or multiple virtual interfaces, for example in different segments of a segmented virtual network.

"Virtual machine manager" encompasses any entity which hosts virtual entities such as virtual machines and can be implemented in the form of software such as an operating system for execution by hardware such as a physical host machine having a general purpose processor, or can be a system comprising such software and hardware, or can be dedicated firmware or hardware or any combination or hybrid of these for example. It is conceivable for some of the functions of the virtual machine manager to be implemented by a privileged virtual entity, hosted by an underlying hypervisor or virtual machine monitor.

"virtual machine monitor" is a component used in some implementations of a virtual machine manager, for hosting of VMs and switching of packets to the appropriate VM, without higher level processing such as routing. It can be the lowest level component of the virtual machine manager, and is sometimes called a hypervisor.

"virtual network" means a network of virtual entities each having their own address so that messages can be passed between them. It may be segmented with virtual gateways to couple different segments. There may be multiple virtual networks in a data center.

"Physical host machine" can encompass any type of processing machine, an example is a server having processing, storage and networking functions. A host can have multiple physical network interfaces for example to provide redundancy or to provide more bandwidth.

"Message" can encompass any sort of packet, cell, frame and so on in any format, with or without a header, of fixed or variable length, with an associated destination address which may be incorporated in the packet, cell or frame, or stored elsewhere.

"Intermediate destination address" can mean a link layer address such as a MAC (media access control) address or other type of address, and can be intermediate in the sense of denoting any point in the virtual or physical network or in communication stacks, passed by the message before reaching the final destination of the message.

"Final destination address" can mean a network layer address such as an IP address, or other address which is either the final destination of the message, or where the message leaves the physical network or virtual network for another network having another addressing scheme.

"farm" means the set of virtual entities owned, operated or controlled by a customer. Each farm can be a virtual network, or there can be multiple farms in a virtual network. Each farm may have one or more subnets.

Introduction to the Described Embodiments:

The problem of detecting liveness is a particular issue in networks where there is no direct visibility between customer VMs and the infrastructure management system. It could be addressed by constructing a multi-hop network proxy path through bastion VMs connecting the customer farm to the management system in order to communicate with an application within a customer VM. However this is cumbersome - also it is not possible to discriminate between a VM liveness failure and a failure in the communication path between the proxies, in other words it would rely on multiple intervening links and so faults in these links could not be distinguished from absence of liveness. Another alternative would be to rely on the use of the virtualization technology (i.e., VMWARE or XEN) to provide information about the guest operating system (OS) running within. But the information VMWARE or XEN can provide is very generic —i.e. whether the whole operating system is alive or not - no indication is provided regarding whether a specific application is still running.

Figure 1:
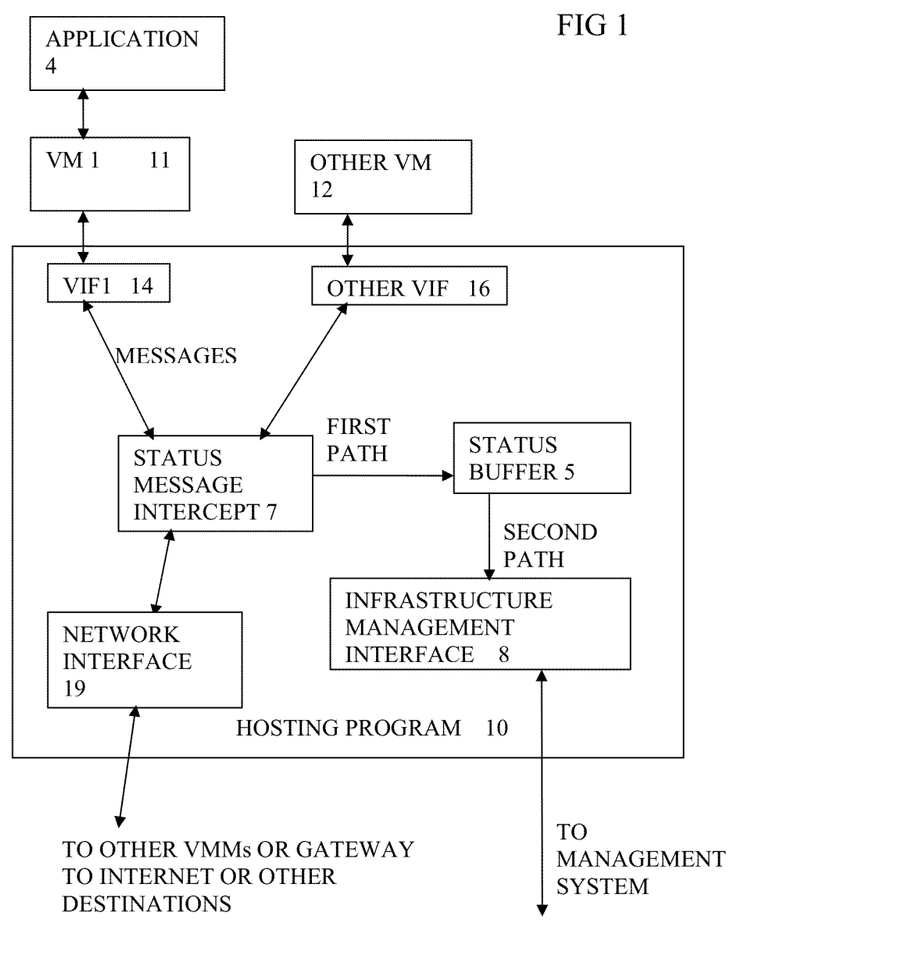
FIG. 1 shows an embodiment showing virtual machines hosted by a hosting program according to an embodiment.
Figure 2:
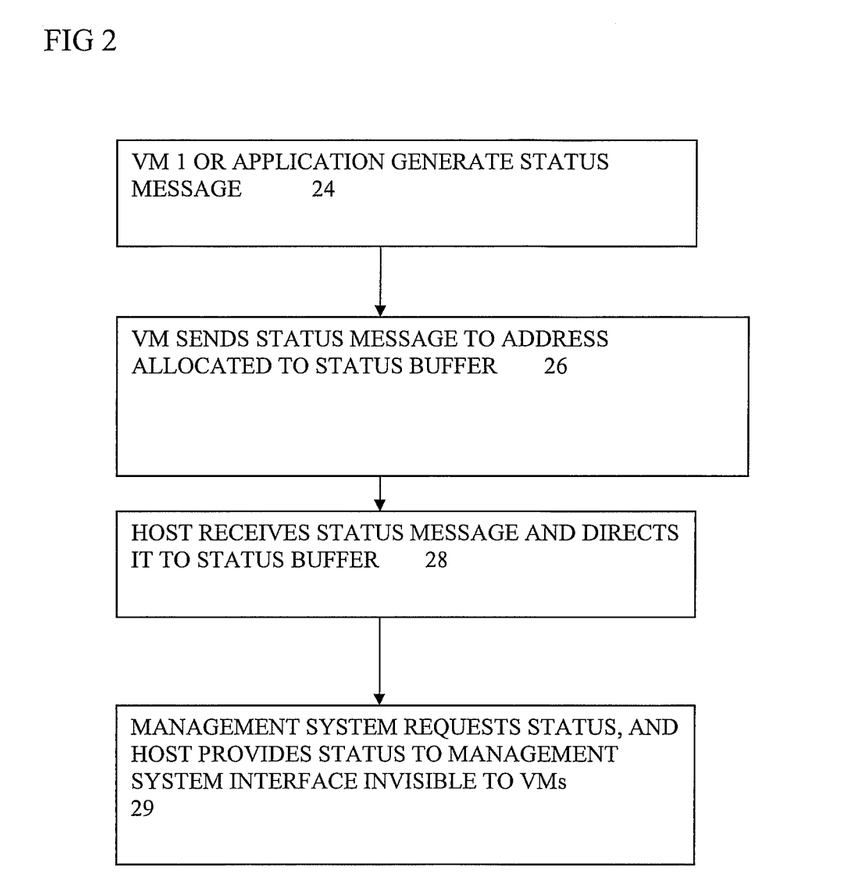
FIG. 2 shows some principal steps in the operation of the embodiment of FIG. 1.

FIGS. 1 and 2, Embodiment of the Invention

FIG. 1 shows some principal features of a first embodiment. A hosting program 10 for execution on computing infrastructure, is arranged to host one or more virtual machines VM1 11, other VM 12. The program has a virtual interface VIF 1 14 or other VIF 16, to the virtual machines, a network interface 19 to enable communication between the virtual machines and other nodes of a network, and an infrastructure management interface 8, invisible to the virtual machines. The program has an intercept function 7 which can be implemented as a comparator, switch or router for example, arranged to intercept a message from one of the virtual machines, the message indicating a status of that virtual machine or of an application being run by that virtual machine. This can be detected by looking in a header of the message for a predetermined destination address for the message, discriminated by a switch or router, or the status message can be detected by a comparator looking at some other part of the message. This part passes the status indication to a status buffer 5. This can be located on the same physical host as the virtual machine, or in principle can be located elsewhere such as another VM on another host elsewhere in the network. There is a benefit to having it co hosted with its VM, in that lack of a new status message cannot then be attributed to a network failure or a failure of that other VM or host, and so is more likely to reflect a failure of the co-hosted VM or application. The program is also arranged to make available the buffered status indication to the infrastructure management interface. This is done without providing a network path between the management interface and the virtual machine so that the management interface remains invisible to the virtual machines. This is useful to maintain isolation so that malicious or accidental actions by a VM do not interfere with the infrastructure management and therefore interfere with other customers VMs.

FIG. 2 shows some of the principal operational steps of an embodiment. At step 24, VM 1 or the application generates a status message. At step 26, the VM sends the status message via its VIF so that it reaches the hosting program. It can be sent to an address allocated to the status buffer, or some other address. At step 28 the host receives the status message, detects or recognises it as such, and directs it or copies it to the status buffer. At step 29, the infrastructure management system requests the status information and the host program makes it available to the management system from the status buffer in a manner invisible to the VMs, and preferably using a path independent of paths used by the VMs so that overload of the network by the VMs will not affect the infrastructure management system.

This has the benefit of being a less cumbersome way which can maintain invisibility requirements and can discriminate between VM failure and communication failure, since it does not need to rely on intervening links. Also it can determine more than OS liveness since it uses a message from the application itself.

Any additional features can be added and some are described in more detail below and form the basis for dependent claims. The status can indicate liveness of the application.

Figure 3:
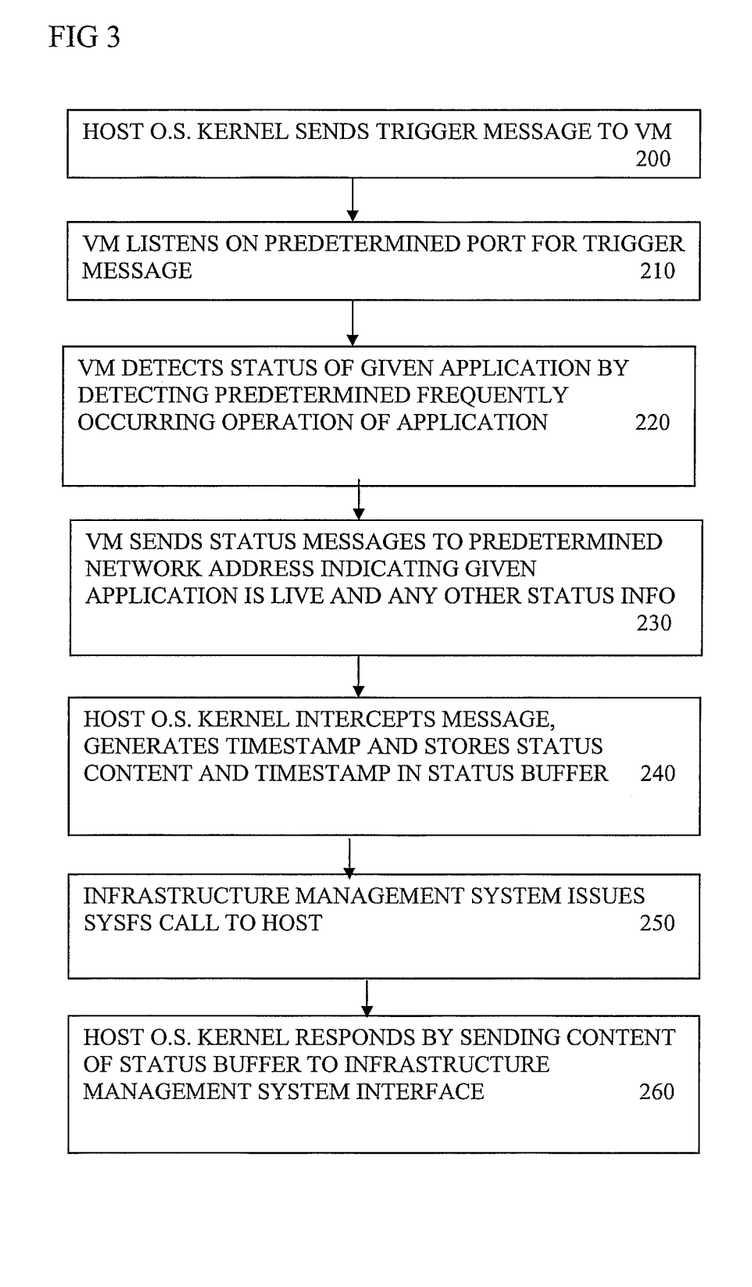
FIG. 3 shows some principal steps according to the same or other embodiments.

FIG. 3 Further Features of Embodiments

The program can comprise an operating system, and the making available can involve a call to a kernel of the operating system. This is one way of decoupling the VMs from the management system. The operating system can have a named file system in which case the call can be a multipart filename call for example to read a particular file. Other arrangements can be envisaged. The program can be arranged to record a timestamp relating to a time the status was generated, which can be in the form of for example a time when the packet was intercepted or stored in the status buffer, or can be a time determined by the application for example. The timestamp can be passed to the infrastructure management interface. This can enable the management system to deduce time between successive status messages and hence infer whether the VM or the application is still alive. In principle the hosting program could be arranged to make this deduction.

The status message can comprise a heartbeat indication, indicating liveness if sent within a time T. A heartbeat implies the status message under normal conditions is provided on a regular basis within a predetermined time so that the liveness of the application can be inferred if a new status message is intercepted within this predetermined time. The status indication can comprise additional information relating to infrastructure usage or forecast requirements of the application. This can provide more information which may be useful to the management system to improve efficiency of allocation of shared resources for example.

The program can be arranged to send a trigger message to one of the virtual machines to prompt the sending of the status message. This can allow the timing of the status message to be determined by the host and thus avoid the need for the application to try to implement a timer. The trigger message can comprise any additional information. An example is information relating to infrastructure availability from the infrastructure management system. This can enable the application to take account of infrastructure issues, to improve performance or reliability for example.

The program can be arranged to determine if the virtual machine is active by sending a message to prompt a response, detect any response to the message, and infer status information about the application according to the detection. It can for example generate the trigger message in the form of a dummy network layer request message, such as an ARP (Address resolution protocol) or internet control message protocol (ICMP) message or transmission control protocol (TCP) SYN which conventionally prompts a response, to the virtual machine, detect any response to the dummy network layer request message, and store an indication of liveness of the virtual machine in the status buffer according to the detection. This is one convenient way to get a response from the VM without needing to modify the VM.

The virtual machines can be arranged to generate a status message relating to a given application when that application carries out a predetermined action, the status message indicating which application it relates to. This is one convenient way of deducing liveness of a particular application without needing to modify the application to generate the message directly.

FIG. 3 shows some of the principal steps according to another embodiment. At step 200 the hosting program in the form of a Linux kernel for example sends a trigger message to the VM. The trigger message can optionally contain other data in an agreed format. This allows system information to be conveyed to the customer VM for example. The VM can be arranged to listen on a predetermined port for the trigger message at step 210. The VM detects the status of the given application by detecting a predetermined frequently occurring action of the application for example. At step 230 the VM sends a status message to a predetermined network address indicating the given application is live and containing any other status information such as current or forecast % usage, which might help the infrastructure management system for example.

At step 240, the host operating system kernel intercepts the status message, by recognising the address or some other distinctive feature of the packet. This can be implemented within a Linux kernel module arranged to examine layer 2 or 3 network-level information in the packet to determine where the packet should be sent. When this code detects a packet being sent to a discriminated address/port the packet can be copied into the status buffer in the form of a kernel buffer, effectively using a first path to the buffer, for example using a network accessible path. The buffer can then be accessed by a second independent path when desired by the management subsystem through calls to the sysfs filesystem (ie by non-networking means as shown at steps 250 and 260, to make it invisible to the VMs and thus not compromise the network visibility rules). This makes the buffer act like a two-port memory device. The hosting system or the infrastructure management interface can be arranged to limit the rate or bandwidth of this information flow so as to avoid the risk of disruption to the infrastructure management system by too great a flow, due to malicious or accidental overloading.

A timestamp is maintained with the kernel buffer so the management system may discover when exactly the packet contained within was sent. If the application does not generate a heartbeat or any other status packet, then, in the VM, some VM code very 'close' to the application of interest is modified to emit heartbeat packets to the discriminated address/port at regular intervals. It is this packet (and its corresponding timestamp) that is made available to the management system via the sysfs filesystem. In other words, VM connectivity status or VM activity representing application liveness information is transmitted by the VM over the usual networking means (VIF) (thus allowing something 'close' to the application to report genuine application liveness) whilst allowing the liveness information to be received by the management system by non-networking means (the second path exemplified by the filesystem calls).

The VM typically has an operating system for running many applications. The operating system typically has a kernel which is a privileged part having a higher priority and more access than other parts. It controls time slicing of processing resources to run a bundle of services and customer specific code such as applications. The VM can be arranged to run a monitoring application which monitors activity by a given application, such as its use of processing time and storage resources, and outputs a status indication to the hosting program. Such monitoring could be done alternatively or as well by a lower level service, or by code in the operating system kernel. In each case the monitoring can be autonomous or prompted by a trigger.

In examples where there are many applications run by a particular VM, the monitoring application or service or kernel code could be arranged to multiplex the status or mere liveness indication into a single message to be sent out over the VIF to be intercepted by the hosting program. In another embodiment, the hosting program could intercept messages from many VMs and multiplex them into a single large status buffer. This buffer could have many slots, each updated separately for status indications for different applications, or different VMs for example. This could be read periodically by the infrastructure management system. Where there are large numbers of VMs or applications, it could be beneficial to reduce the number of status messages sent, or the number of read operations by the infrastructure management system in this way.

FIGS. 4 to 7, Virtual Network Examples

In some embodiments, the host can be arranged to examine message header information in messages from the virtual machines, to intercept the status messages. The header can have a predetermined link layer or network layer address for example or some other distinctive feature. Such features can be implemented within a Linux kernel module that provides secure virtual networking support to customer VMs. The virtual networking code examines packets as they are emitted from VMWARE or XEN VMs and examines layer 3 network-level information in the packet to determine where the packet should be sent.

Figure 4:
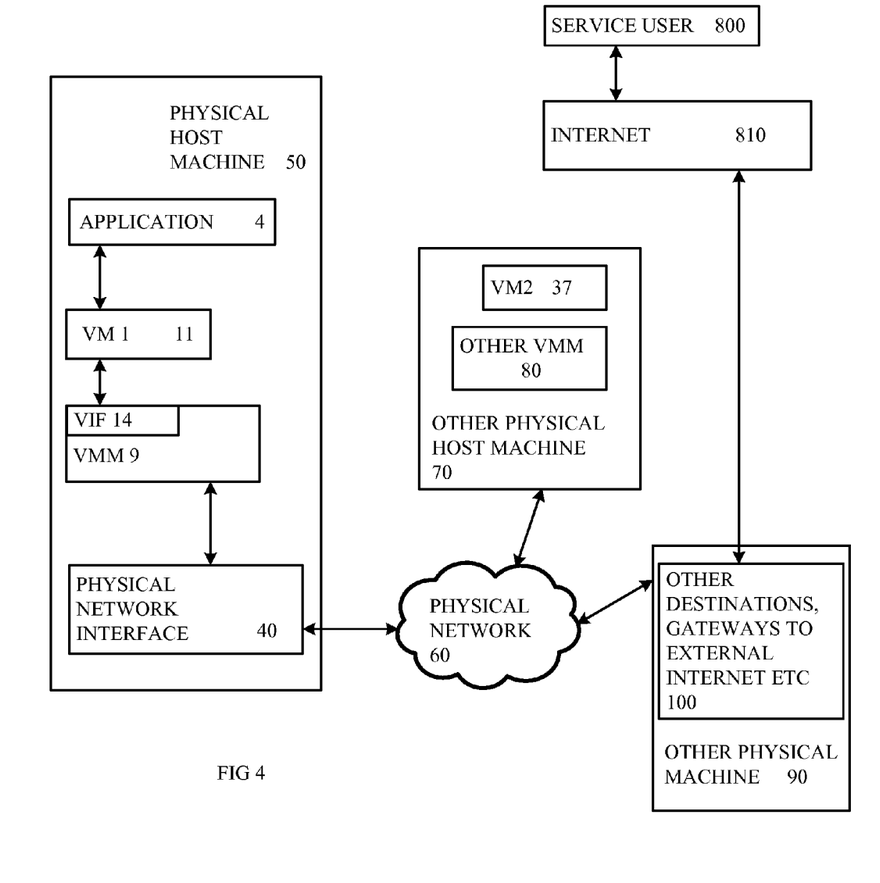
FIG. 4 shows a schematic view of an arrangement of multiple host machines coupled by a network for hosting applications to be used by a user, according to embodiments of the invention.

In some embodiments, as for example shown in FIG. 4, the hosting program is in the form of a virtual machine manager (VMM) 9 and has a physical network interface (40) to communicate with other entities over a physical communications network (60), to route messages to such other entities. A VIF 14 is coupled to VM1 11 which hosts the application 4.

The other entities can comprise other virtual machine managers (80), and the VMM can be arranged to determine which of the other virtual machine managers to route the message to. The physical hosts and network can make up a data center in a single location, or the physical network can include a wide area network and connect to hosts at different locations.

FIG. 4 shows the VMM 9 in the form of software run by a physical host machine 50. VM2 37 is shown hosted by another physical host machine 70. Also shown are other destinations, gateways to external networks such as the internet and so on, 100, hosted on another physical machine 90. This means that applications run by the VMs can provide services to users 800 over the internet 810 such as web based services of any type. Packets are sent to the application from the user, via the gateway and the network and the hosting program in the form of the VMM. Packets are sent back to the user from the application via the VMM, the network and the gateway.

An infrastructure management system is responsible for allocating the physical resources for processing storage and network bandwidth between different customers. This system can be located anywhere in the network and can be centralised or distributed, following established practice. If the management system determines an application has lost liveness, or has some other unusual status, such as being overloaded, or appears to be repeating an endless loop, it could alert the customer operator responsible for providing that application. It is the customer operator who has control of the application and can initiate remedial action promptly, to restore service to users or to set up more instances of applications to relieve overloading, and so on.

From the service user's point of view, they communicate with the application by sending and receiving packets, and if the application fails, they have no easy way of alerting the service provider. They are likely to desert that service provider and find other services, hence it is in the interests of the service provider to be alerted to application failures, and hence it may be valuable for a data center to be able to offer to its service provider customers a feature or service of monitoring and alerting application status. The sending of the status message can in many cases be triggered or prompted directly or indirectly by the activity of the application caused by the user using the service.

Typically IP is used as the network layer protocol and so the applications send IP packets, and Ethernet is used as the underlying transport mechanism, though other protocols can be used as appropriate as would be apparent to those skilled in the art.

Figure 5:
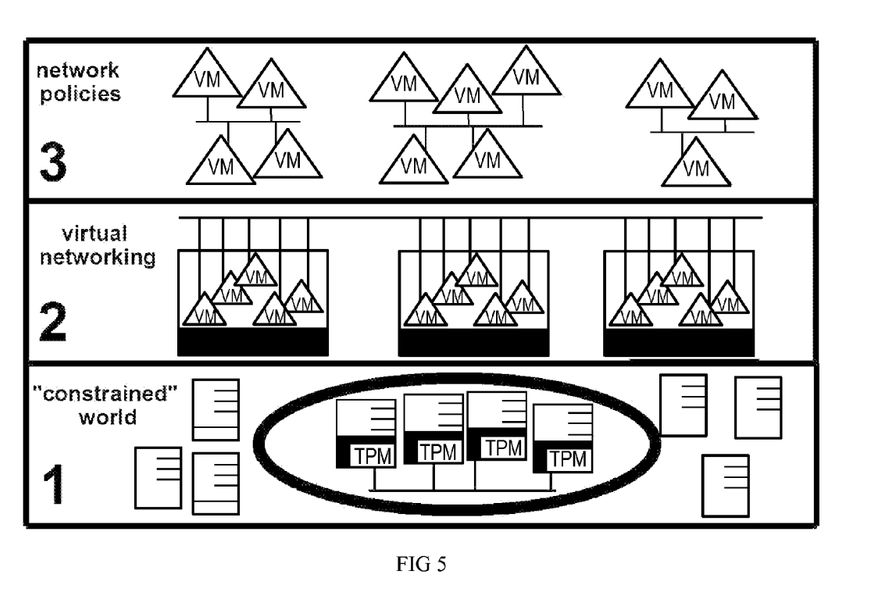
FIGS. 5 to 7 show arrangements of virtual machines to form virtual networks according to embodiments.

FIG. 5 shows a schematic view having three layers. In a shared data center network there has to be a feasible way of guaranteeing that only machines in a known, good state can access a secure, trusted network, and that no other machines can interfere with the system. On top of this, different (potentially competing) parties owning VMs within the virtualized infrastructure need dedicated, isolated virtual network resources while running over this shared, underlying physical network. The embodiments described can provide a way to validate network policies automatically to provide assurance about a system's global state from a networking point of view—which may be required to fulfil certain Service Level Agreements (SLAs).

The three layers illustrated are a physical layer having a number of constraints, a virtual networking layer and a top layer of network policies. The first layer shows a physical network having a number of servers coupled by a network. The second layer shows a number of virtual machines hosted on each host, and coupled together on subnets to form a farm. The third level shows groups of virtual machines each isolated from other groups according to the policies.

(1) On the physical network level the known 802.1X network access control standard can be used provided for example by HEWLETT PACKARD PROCURVE switches; additionally, known trusted computing technologies can ensure that all physical machines are in a known good state. A single, trusted VLAN can be provisioned on all infrastructure switches. Access to this VLAN is only granted after a successful authentication using 802.1X. Machines that wish to be part of this trusted infrastructure are provisioned with a cryptographic key for the 802.1X authentication. However, this key is "sealed" to a specific, trusted platform configuration (the Trusted Computing Base or TCB) through a secure provisioning process and protected by a Trusted Platform Module (TPM) on that machine. Sealing ensures that the TPM will only release this secret (the network authentication key) if the platform is running a valid, attested TCB, and only then will the host be granted access to the secure VLAN. Through this mechanism a secure, "constrained world" network can be provided in which all machines can be trusted. As an alternative to the 802.1X solution, an approach in which communication between trusted machines is encrypted (or at least authenticated) can be provided and therefore protected from interference from untrusted machines that are hosted within the same physical infrastructure. In this scenario a gatekeeper component can be provided to which new nodes have to authenticate and prove that they run an attested TCB (again using Trusted Computing technologies) before they are provisioned with the network authentication key, so that they can participate in the secure communication.

(2) On top of this trusted infrastructure the secure network virtualization can be provided that is easy to manage and validate. Virtualisation based on layer 3 (network-level) information can provide the illusion of farms consisting of several subnets as shown for example in FIG. 6. For example the virtual IP address space is segmented by assigning IP addresses of the format 10.<FARM>.<SUBNET>.<HOST> to VMs. By default, VMs inside a subnet can communicate with each other without any restrictions, but communication between VMs of different subnets has to be explicitly allowed by the farm owner. Communication across two different farms is only permitted if both sides have mutually agreed on such a communication. At the core of the network is a notional gateway connecting all the subnets within a farm. The gateway mediates all inter-subnet communications within the farm and inter-farm communications across multiple farms. Its actual functionality is contained in the routers distributed amongst all the physical machines hosting VMs within the farm, as described in more detail in above referenced co pending applications.

Where the underlying physical infrastructure is a fully switched network, distributed routers in VMMs can quickly discover the location of (virtual) IP addresses and pass packets directly to the destination machine without needing hops to virtual gateways. This can have a notable performance impact, especially for inter-farm communication. By operating on layer 3 network level information, the need for deploying and configuring routing entities (like routing VMs) can be avoided which is an important advantage in terms of manageability. Also, managing MAC addresses of many thousands of VMs is a significant burden for physical switches within virtualized infrastructures. By using address rewrite, no MAC addresses of VMs appear on the physical wire, which provides the illusion of virtual gateways and limits broadcast and multicast traffic.

The connection policies between VMs and between farms can be set and modified by customers as set out in more detail in the above referenced co pending applications.

Figure 6:
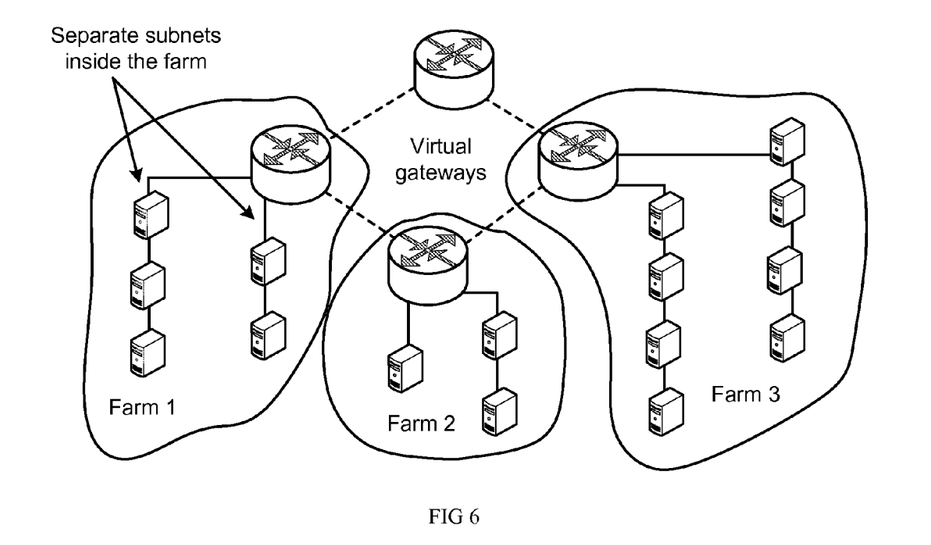

FIG. 6 shows an arrangement of a segmented virtual network which can be created using the VMMs of the embodiments described above for example. The virtual machines are grouped into farms, typically each farm can be for a different customer, or for different departments of a given organisation for example. Each farm is further divided into segments called subnets. Each subnet is coupled to other subnets in the same farm by a virtual gateway. Farms 1, 2 and 3 are shown, each having a virtual gateway with two subnets, though there can of course be many more subnets. Each virtual machine maintains the addresses of other virtual machines on its subnet, so that it can send messages to such other machines without restrictions or controls imposed by a virtual gateway. Optionally messages can be passed between farms by the virtual gateways. A fourth virtual gateway is shown not attached to a farm, which can be used for coupling to other destinations such as external networks.

The arrangement or topology of the virtual network can be completely independent of the topology of an underlying physical network. The topology of the subnets in an individual farm can be customer determined. The VMM or VMMs can provide a transparent virtual network layer which means that virtual machines do not need to know anything about the underlying physical network infrastructure (as for example that there is a single physical machine, or in another example, that there are many physical machines coupled by a completely switched physical network). Additionally, it is possible to configure VM-specific network policies on top of the virtual infrastructure, as will be explained below in more detail.

Figure 7:
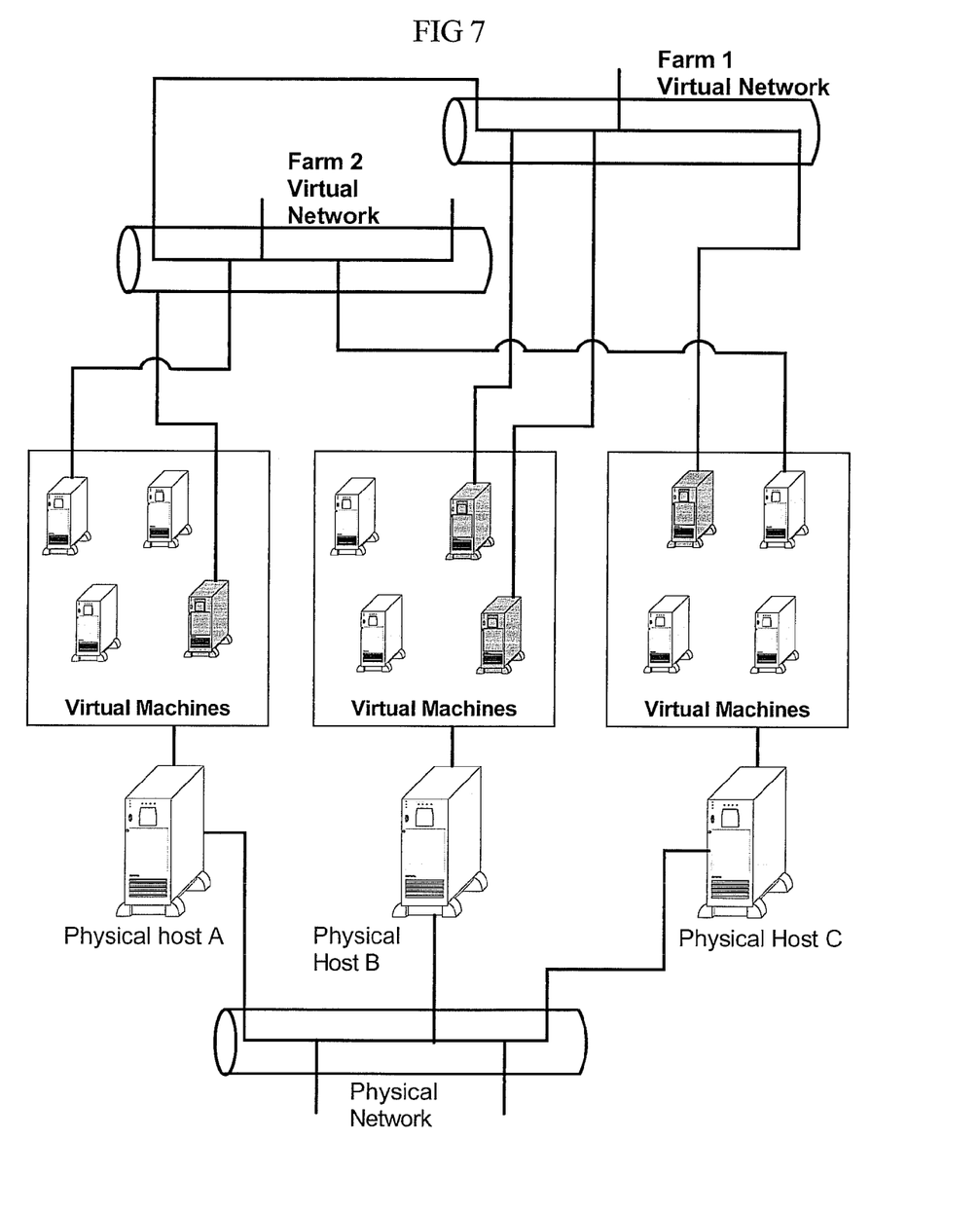

FIG. 7 shows an example of a number of virtual networks in the form of farms having a number of virtual machines hosted on a number of physical hosts, A, B and C in this case. As can be seen, farm 1 has virtual machines on hosts A, B and C, and farm 2 has virtual machines on hosts A and C. Of course other arrangements can be envisaged.

Implementation:

The applications run by the data centers can include any type of software including computer-aided design (CAD), database, web page server, and other types. The virtual machines can be implemented using any conventional programming language, including languages such as C, and compiled following established practice. The servers and network elements can be implemented using conventional hardware with conventional processors. The processing elements need not be identical, but should be able to communicate with each other, e.g. by exchange of messages.

Other variations can be conceived within the scope of the claims.

What is claimed is:

1. A computer readable non-transitory medium on which is stored a hosting program for execution by a processor on a computing infrastructure, wherein the hosting program is to host one or more virtual machines, the hosting program comprising:
   a virtual interface to the one or more virtual machines;
   a network interface to communicate between the one or more virtual machines and other nodes of a network; and
   an infrastructure management interface that is invisible to the one or more virtual machines,
   wherein the hosting program is to intercept a message from one of the one or more virtual machines, the message comprising a status indication of an application run by the virtual machine, and to buffer the status indication, wherein the hosting program is to further make available the buffered status indication to the infrastructure management interface without providing a network path between the infrastructure management interface and the virtual machine.

2. The computer readable non-transitory medium of claim 1, wherein the status indication indicates liveness of the application.

3. The computer readable non-transitory medium of claim 1, wherein the hosting program is to perform the buffering of the status indication on a same physical host as used by the hosting program.

4. The computer readable non-transitory medium of claim 1, wherein the hosting program comprises an operating system, and the hosting program is to make available the buffered status indication in response to a call to a kernel of the operating system from the infrastructure management interface.

5. The computer readable non-transitory medium of claim 1, wherein the hosting program is to record a timestamp relating to a time the status indication was generated, and to pass the timestamp to the infrastructure management interface.

6. The computer readable non-transitory medium of claim 1, wherein the message under normal conditions is provided on a regular basis within a predetermined time so that the liveness of the application can be inferred if a new message is intercepted within the predetermined time.

7. The computer readable non-transitory medium of claim 1, wherein the status indication comprises additional information relating to infrastructure usage or forecast requirements of the application.

8. The computer readable non-transitory medium of claim 1, wherein the hosting program is to send a trigger message to one of the one or more virtual machines to prompt the virtual machine to send the message.

9. The computer readable non-transitory medium of claim 8, wherein the trigger message comprises additional information from the infrastructure management interface.

10. The computer readable non-transitory medium of claim 1, wherein the hosting program is to determine if the virtual machine is active by sending a message to prompt a response, detect any response to the message, and infer status information about the application according to the detection.

11. The computer readable non-transitory medium of claim 1, wherein the one or more virtual machines are to generate the message relating to a given application when the application performs a predetermined action, wherein the message indicates to which application the message relates.

12. The computer readable non-transitory medium of claim 1, wherein the hosting program is to examine message header information in messages from the one or more virtual machines, and to further intercept the messages.

13. A method of hosting one or more virtual machines, using a host machine including a network interface to communicate between the one or more virtual machines and other nodes of a network, and including an interface to an infrastructure management system that is invisible to the one or more virtual machines, the method comprising:
   intercepting a message from one of the one or more virtual machines comprising a status indication of an application run by the virtual machine;
   buffering the status indication; and
   making available the buffered status indication to the infrastructure management interface without providing a network path between the infrastructure management interface and the virtual machine.

14. A data center including a number of hosting machines, coupled by a network, each of the hosting machines including a hosting program, the hosting program is to host one or more virtual machines, the hosting program comprising:
   a virtual interface to the one or more virtual machines;
   a network interface to enable communication between the one or more virtual machines and other nodes of the network; and
   an infrastructure management interface that is invisible to the one or more virtual machines,
   wherein the hosting program is to intercept a message from one of the virtual machines, the message comprising a status indication of an application run by the virtual machine, and to buffer the status indication, the hosting program is to further make available the buffered status indication to the infrastructure management interface without providing a network path between the infrastructure management interface and the virtual machine.

15. A method of providing a service from a data center, the data center including a number of hosting machines coupled by a network, each of the hosting machines is to host one or more virtual machines, provide a virtual interface to the one or more virtual machines, a network interface to enable communication between the one or more virtual machines and other nodes of the network, and an infrastructure management interface that is invisible to the one or more virtual machines, the method comprising:

providing an application on one of the virtual machines to provide the service;

making the application accessible to users of the service; and     receiving a status indication of the application via the infrastructure management interface,     wherein the hosting machine is to intercept a message from the virtual machine on which the application is running, the message comprising a status indication of the application, and to buffer the status indication, the hosting machine is to further make available the buffered status indication to the infrastructure management interface without providing a network path between the infrastructure management interface and the virtual machine.

16. A method of using a service offered by an application running on a virtual machine hosted in a data center, the data center including a number of hosting machines, coupled by a network, wherein each of the hosting machines is to host one or more virtual machines and provide a virtual interface to the one or more virtual machines, a network interface to enable communication between the one or more virtual machines and other nodes of the network, and an infrastructure management interface, invisible to the one or more virtual machines, the method comprising:

sending and receiving packets to and from the application at the data center and the virtual machine on which the application is running; and     sending a message comprising a status indication of the application,     wherein the hosting machine is to intercept the message, and buffer the status indication, and wherein the hosting machine is to further make available the buffered status indication to the infrastructure management interface without providing a network path between the infrastructure management interface and the virtual machine.

17. A method comprising:

hosting a virtual machine on a physical host machine, the host machine providing a network interface to enable communication between the virtual machine and other nodes of a network and having an interface to an infrastructure management system that is invisible to the virtual machine;

intercepting a message from the virtual machine;

buffering the intercepted message; and making available the buffered intercepted message to the infrastructure management interface.

* * * * *

UNITED STATES PATENT AND TRADEMARK OFFICE
CERTIFICATE OF CORRECTION

PATENT NO. : 8,627,313 B2 Page 1 of 1
APPLICATION NO. : 12/400510
DATED : January 7, 2014
INVENTOR(S) : Aled Edwards et al.

It is certified that error appears in the above-identified patent and that said Letters Patent is hereby corrected as shown below:

In the Specification

In column 1, line 31, after "infrastructures" delete "IT infrastructure".

Signed and Sealed this
Twentieth Day of May, 2014

Michelle K. Lee
*Deputy Director of the United States Patent and Trademark Office*